US012000942B2

(12) United States Patent
Alawieh et al.

(10) Patent No.: US 12,000,942 B2
(45) Date of Patent: Jun. 4, 2024

(54) METHODS AND APPARATUSES FOR POSITIONING IN A WIRELESS COMMUNICATIONS NETWORK

(71) Applicant: Fraunhofer-Gesellschaft zur Förderung der angewandten Forschung e.V., Munich (DE)

(72) Inventors: Mohammad Alawieh, Erlangen (DE); Ernst Eberlein, Erlangen (DE); Tobias Feigl, Erlangen (DE); Thomas Von Der Grün, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 161 days.

(21) Appl. No.: 17/770,165

(22) PCT Filed: Oct. 5, 2020

(86) PCT No.: PCT/EP2020/077834
§ 371 (c)(1),
(2) Date: Apr. 19, 2022

(87) PCT Pub. No.: WO2021/089258
PCT Pub. Date: May 14, 2021

(65) Prior Publication Data
US 2022/0404451 A1 Dec. 22, 2022

(30) Foreign Application Priority Data
Nov. 7, 2019 (EP) .................................... 19207844

(51) Int. Cl.
*G01S 5/00* (2006.01)
*G01S 5/02* (2010.01)
*G01S 5/10* (2006.01)

(52) U.S. Cl.
CPC .......... *G01S 5/0036* (2013.01); *G01S 5/0218* (2020.05); *G01S 5/10* (2013.01)

(58) Field of Classification Search
CPC ......... G01S 5/0036; G01S 5/0218; G01S 5/10
(Continued)

(56) References Cited

U.S. PATENT DOCUMENTS

| | | | |
|---|---|---|---|
| 2005/0073947 A1* | 4/2005 | Dey | H04L 25/0218 370/480 |
| 2006/0093050 A1* | 5/2006 | Strait | H04L 27/2626 375/260 |

(Continued)

FOREIGN PATENT DOCUMENTS

EP   3259613 B1 *   1/2021   .............. G01S 11/02

OTHER PUBLICATIONS

International Search Report and Written Opinion of the International Searching Authority, dated Nov. 27, 2020, International Application No. PCT/EP2020/077834, European Patent Office.
(Continued)

*Primary Examiner* — Harry K Liu
(74) *Attorney, Agent, or Firm* — Burr & Forman LLP; Jeffrey H. Kamenetsky

(57) ABSTRACT

The present disclosure relates to methods and apparatuses for improving positioning of a device in a wireless communications network. In some embodiments, a method performed by a measuring device configured to communicate with a positioning device, comprises: determining a cross-correlation between a received signal and a transmitted reference signal; determining a channel impulse response (CIR) of the cross-correlation related to a first lobe detected above a selected threshold in said CIR; and reporting information on a truncated part of the CIR around the first lobe to the positioning device for enabling the positioning
(Continued)

device to correct or estimate a measurement related to a distance between a transmitter and the measuring device and/or a distance between at least one reflecting cluster and the measuring device.

20 Claims, 15 Drawing Sheets

(58) Field of Classification Search
USPC .......................................................... 342/451
See application file for complete search history.

(56) References Cited

U.S. PATENT DOCUMENTS

| | | |
|---|---|---|
| 2012/0020320 A1 | 1/2012 | Issakov et al. |
| 2016/0018508 A1* | 1/2016 | Chen ..................... G01S 5/0218 455/456.1 |
| 2018/0227877 A1 | 8/2018 | Gunnarsson et al. |

OTHER PUBLICATIONS

International Preliminary Report on Patentability, dated Mar. 1, 2022, International Patent Application No. PCT/EP2020/077834, European Patent Office.

3GPP TSG RAN WG1 #98, Prague, CZ, Aug. 26-30, 2019, UE and gNB Measurements for NR Positioning, Ericsson.

* cited by examiner

METHODS AND APPARATUSES FOR POSITIONING IN A WIRELESS COMMUNICATIONS NETWORK

CROSS-REFERENCE TO RELATED APPLICATION

This application is a national stage application, filed under 35 U.S.C. § 371, of International Patent Application No. PCT/EP2020/077834 filed on Oct. 5, 2020, and European Patent Application No. 19207844.2 filed Nov. 7, 2019, which are incorporated by reference herein in their entirety.

TECHNICAL FIELD

The disclosure relates to the field of wireless communications, and in particular to methods and apparatuses for positioning based on a reporting of correlation information.

BACKGROUND

In wireless telecommunications systems such as LTE (Long Term Evolution) or 5G ($5^{th}$ Generation mobile network system) also known as the New Radio (NR), several timing- based positioning methods are supported for determining a position of a UE (User Equipment) or a radio communication device in general. Examples of supported methods include TDOA (Time Difference Of Arrival) and RTT (Round Trip Time or Timing advance (TA)). In TDOA, there are two approaches which may be used: OTDOA (Observed Time Difference Of Arrival) and UTDOA (Uplink Time Difference Of Arrival).

In OTDOA, a UE-assisted method is employed in which a UE measures the TOA (Time Of Arrival) of PRS (positioning reference signals) transmitted from multiple radio base stations and RSTD (Reference Signal Time Difference) measurements are sent by the UE to a location or positioning server or center.

In UTDOA, uplink TOA measurements are performed at multiple receiving points (e.g. radio base stations) based on signals transmitted from a UE. These measurements are sent to a location or positioning server or center for determining the location of the UE.

All these methods rely on measuring the distance by ToF (Time-of-Flight) measurements which are derived from the TOA measurements. The ToF measurement may fail in hard channel conditions, for example if a direct signal or a LOS (Line of Sight) signal is blocked by obstacles or clusters or the signal is heavily impaired by multipath propagation.

If a measurement device (a UE or a network node) does not provide additional information beyond the TOA measurement, the position computing/calculation unit (such as a Location Management Function (LMF)) may not be able to (1) correct the TOA error, or (2) to determine the quality of the measurement.

As mentioned above, PRSs are transmitted from a device (e.g. a radio base station). In case of a bandwidth limited PRS signal, the correlation peak does no longer represent a "Dirac Impulse":

According to the bandwidth, the CIR (Channel Impulse Response) samples are correlated, and the correction peak has a width of 1/bandwidth.

The correlation peak is an overlap of several multipath components of the received signal arriving with a small time difference (e.g. TOA arrival difference is less than 1/bandwidth).

The multipath components add constructively or destructively depending on the phase and delay with regards to the signal wavelength.

At the measurement/measuring device (such as UE), the following effects may occur:

Effect 1: The $1^{st}$ path is attenuated or nearly cancelled out. In this case, the measurement device reports a late TOA causing additional error(s) on the total delay.

Effect 2: The different paths of the signal may add in a way that results in an early false detection. In this case, the measurement device reports an early TOA causing additional error(s) on the total delay, and may use the positioning computation to assume it is the real TOA and correct the TOA measurement(s) accordingly.

Effect 3: the correlation profile results in different characteristics which may include wider area under the correlation profile and displacement between a first identified path and the resulting peak.

FIG. 1A illustrates multipath propagation of a signal transmitted from a radio base station 101 to a UE 102. Several signal paths are shown. Signal d1 is a direct signal (Line Of Sight signal) from the radio base station 101 to the UE 102, whereas d2 and d3 are sub-paths of the same signal d1 which are generated by two reflecting clusters 103 and 104 respectively. FIG. 1B illustrates the effect of the multipath propagation from two signals path-1 and path-2 which can constructively (and result in increasing amplitude) or cancelling it out depending on the arrival paths difference with regards to the signal wavelength (Lambda).

Two application scenarios may be distinguished:

Non LOS reception: If a detected correlation peak does not represent the direct path (e.g. the signal strength of the direct path is very weak), a calculated position may be wrong, or information must be provided that the measurement is not reliable.

LOS reception with multipath impairments: In this case, the first arriving path is impaired by multipath (e.g. reflections from objects/obstacles close to the transmitter and/or the receiver) or the first path is received with lower power. In this case additional information from the CIR corresponding to the reflecting clusters can provide additional information.

To enable a UE to report information on additional paths for the OTDOA method, a protocol known as the LTE positioning protocol (LPP) may be used. LPP is defined in [1] and is employed for protocol-based transfer of positioning related communication between the UE and a network node e.g. a location server or a location center E-SMLC (Evolved Serving mobile Location Center).

In LPP, a message, also called an IE (Information Element) AdditionalPath is used by a target device (UE) to provide the information about the additional paths associated to the RSTD measurements in the form of a relative time difference and a quality. The IE AdditionalPath and it field description is depicted below:

```
-- ASN1START
AdditionalPath-r14 ::= SEQUENCE {
    relativeTimeDifference-r14 INTEGER (-256..255),
    path-Quality-r14          OTDOA-MeasQuality    OPTIONAL,
    ...
}
-- ASN1STOP
```

| AdditionalPath field descriptions |
| --- |
| relativeTimeDifference<br>This field specifies the additional detected path timing relative to the detected path timing used for the rstd value in units of 0.5 Ts, with Ts = 1/(15000*2048) seconds. A positive value indicates that the particular path is later in time than the detected path used for RSTD; a negative value indicates that the particular path is earlier in time than the detected path used for RSTD.<br>path-Quality<br>This field specifies the target device's best estimate of the quality of the detected timing of the additional path. |

As shown above, the field additional path relativeTimeDifference specifies the additional detected path timing relative to the detected path timing used for the rstd value, and each additional path can be associated with a quality value path-Quality which specifies the UE's best estimate of the quality of the detected timing of the additional path.

The OTDOA-MeasQuality is defined in LTE by a value which, combined with the resolution, gives an indication of the error at the device in meters.

Additional peak reporting is suggested in the prior art [3]. The approach suggests extending the LPP reporting on RSTD measurements and RTD (Relative Time Distance) measurements as described below:

1. The RSTD measurements are time difference measurements between a first path of a neighbor cell and a first path of a reference cell. The number of detected neighbor cells N may be restricted by a configured maximum number of neighbor cells.
2. The RTD measurements are time difference measurements of multipath paths from any specific cell. For example, with P paths detected, there can be up to P additional paths per cell, unless there is a maximum number of additional paths configured.

In [1], LPP enables only the UE to report the RTD without any information on the correlation strength. In [3], an extension of LPP RTD reporting is proposed by adding the correlation strength information and extending this reporting for finer resolution near the first or strongest peak.

[5] discloses UE and gNB measurements for NR positioning. [5] suggests finer RSTD measurements which implies timing related measurements at the UE which are near the first peak. An RSTD measurement is a processed timing measurement extracted from the CIR and "finer" implies reducing the reporting of RSTD to the relevant measurement region. Hence, in [5], only information to an early RSTD or late RSTD measurements is provided, this means that the accuracy of the RSTDs or timing is not enhanced.

There are thus drawbacks with the known approaches which include:

The device reports based on pre-defined criteria (i.e. regardless of the TOA quality)

The reported information is limited to the RTD and peak power extracted from the absolute value for the correlation profile; whereby this leads for loss of information needed at the location server to apply high resolution schemes for TOA estimation.

The UE or device reporting is limited to one positioning event. In an example, a UE experiences multipath reflection from clusters with a known position (like a traffic sign or a building) and other stochastic or moving reflectors like a car. The peaks resulting from such a multipath environment could be stronger in certain measurement times than the reflection from known clusters. Since this information is unknown at the device or UE the reporting will be the moving cluster and hence the information is useless to the location server. Further, the location server does not provide assistance data to the measuring device on the reporting scheme.

SUMMARY

It is thus an object of embodiments herein to provide methods and apparatuses to enhance estimation or correction of measurements performed by a measuring device and reported to a positioning device.

According to an aspect of embodiments herein, there is provided a method performed by a measuring device configured to communicate with a positioning device. The method comprising determining a cross-correlation between a received signal and a transmitted reference signal; determining a CIR of the cross-correlation, related to a first lobe detected above a selected threshold in said CIR. The method further comprising reporting, to the positioning device, a truncated part of the CIR around the first lobe for enabling the positioning device to correct or estimate a measurement related to a distance between a transmitter and the measuring device and/or a distance between at least one reflecting cluster and the measuring device, wherein the first lobe includes a first arrival path and the truncated part of the CIR includes a selected number of samples around the first arrival path in the CIR.

According to another aspect of embodiments herein, there is provided a measuring device configured to communicate with a positioning device, the measuring device comprising a processor and a memory containing instructions executable by the processor whereby the measuring device is operative to perform the subject matter disclosed herein.

According to some embodiments, there is provided a method performed by a positioning device configured to communication with a measuring device, the method comprising: configuring the measuring device to determine a cross-correlation between a received reference signal received by the measuring device and a transmitted reference signal; configuring the measuring device to determine a CIR of the cross-correlation, related to a first lobe detected above a selected threshold in said CIR; receiving from the measuring device a report including a truncated part of the CIR around the first lobe, wherein the first lobe includes a first arrival path and the truncated part of the CIR includes a selected number of samples around the first arrival path in the CIR; and correcting or estimating a measurement related to a distance between a transmitter and the measuring device and/or a distance between at least one reflecting cluster and the measuring device.

According to some embodiments, there is provided a positioning device configured to communicate with a measuring device, the positioning device comprising a processor and a memory containing instructions executable by the processor whereby the positioning device is operative to perform the subject matter disclosed herein.

An advantage with embodiments herein, is that the amount of data used for reporting CIR related information is reduced significantly. This also means that less resources are used for reporting the information on the truncated CIR.

Another advantage with embodiments herein is to improve the calculation of the position/location of a target device, by providing additional information on the CIR, in addition to the TOA, even in challenging environments.

BRIEF DESCRIPTION OF THE DRAWINGS

The accompanying drawings illustrate various embodiments of the present disclosure and, together with the description, further serve to explain the principles of the disclosure.

DETAILED DESCRIPTION

In the following a detailed description of the exemplary embodiments herein is presented in conjunction with the drawings.

Figure 1A:
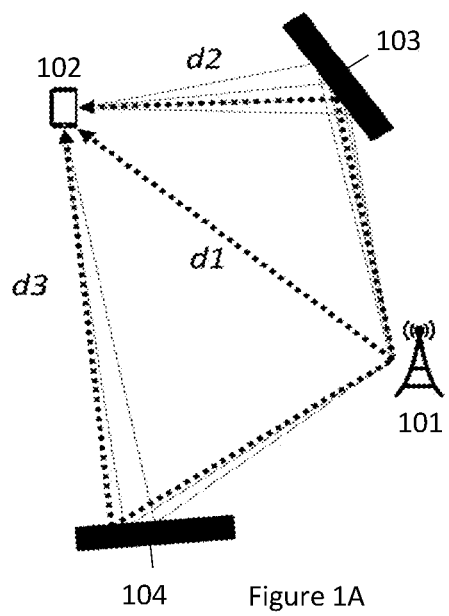
FIG. 1A illustrates multipath propagation of a signal transmitted from a network node to UE and two reflecting clusters generating several paths of the same signal.
Figure 1B:
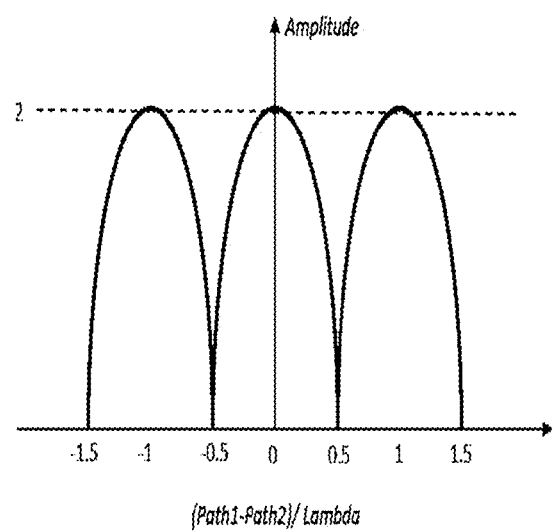
FIG. 1B illustrates an example of the effect of the multipath propagation.
Figure 2:
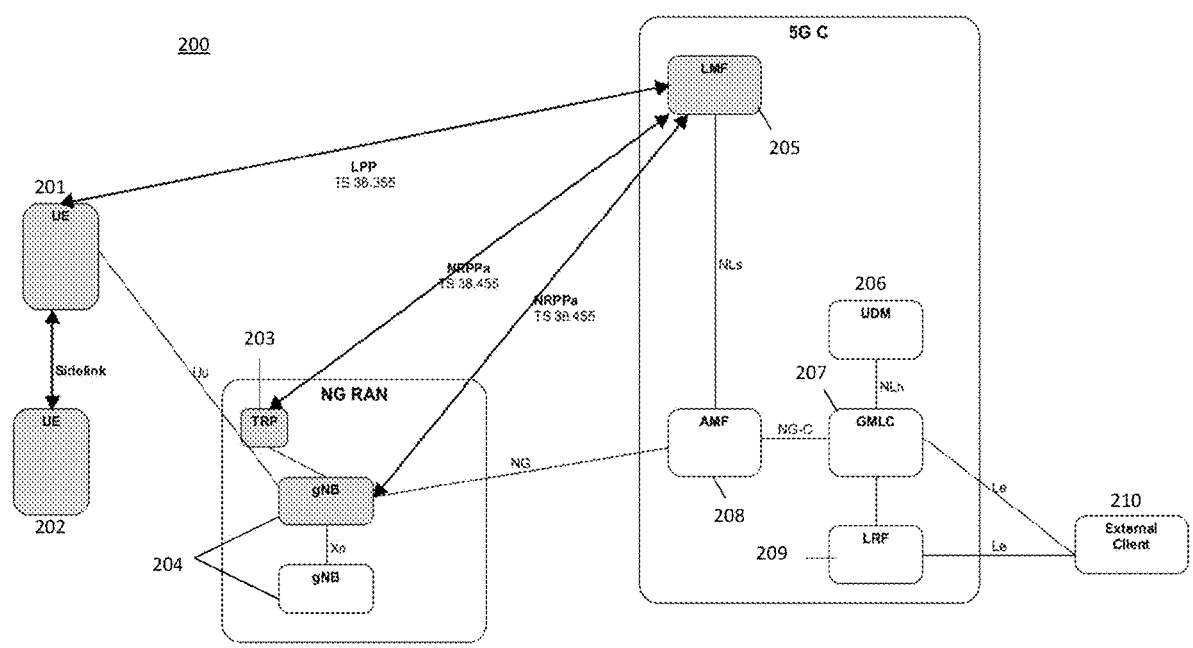
FIG. 2 illustrates an example of a 5G architecture wherein embodiments of the present disclosure may be employed.

FIG. 2 illustrates a simplified 5G architecture wherein embodiments of the present disclosure may be employed. In this architecture 200, two UEs 201 and 202 are shown which may communicate with each other using sidelink for Vehicle-two-Vehicle (V2V) or Device-to-Device (D2D) applications. The UEs may also communicate with a Location Management Function (LMF) 205 in the 5G core network. The protocol used to convey messages between the UE 201 and the LMF 205 is LPP [1] and is defined in the 3GPP Technical Specification TS 36.255. The 5G (or NG) Radio Access Network (RAN) may comprise a Transmission and Reception Point (TRP) 203 and one or more radio base stations (eNBs or gNBs) 204. The protocol used to convey messages between the TRP 203 and the LMF 205 or between the gNB 204 and the LMF 205 is known as NRPPa [2] and is defined in 3GPP TS 38.455. The interface used between two gNBs is known as the Xn interface. Additional nodes shown in FIG. 2 include the Access and Mobility Management Function (AMF) 208, the Unified Data Management (UDM) 206, the Gateway Mobile Location Center (GMLC) 207, and the Location Retrieval Function (LRF) 209. The interfaces and protocols used within the 5G core network are also shown. The external client 210 may be any client configured to transmit location requests across the Le interface to the GMLC 207 or the LRF 209. FIG. 2 shows the entities or nodes in grey which may be employed using the embodiments disclosed herein.

A UE 201 may detect multiple downlink signals transmitted from one or more gNBs 204 and/or one or more TRPs 203. Positioning Reference Signals (PRSs) are examples of downlink signals. The UE 201 may make measurements on the PRSs, such as Time-Of-Arrival (TOA) measurements. TOA is sometimes called Time-of-Flight (ToF) and is the travel time of a signal from the transmitter to the UE. The UE 201 is also referred to as a measuring device or a measurement device.

Figure 3:
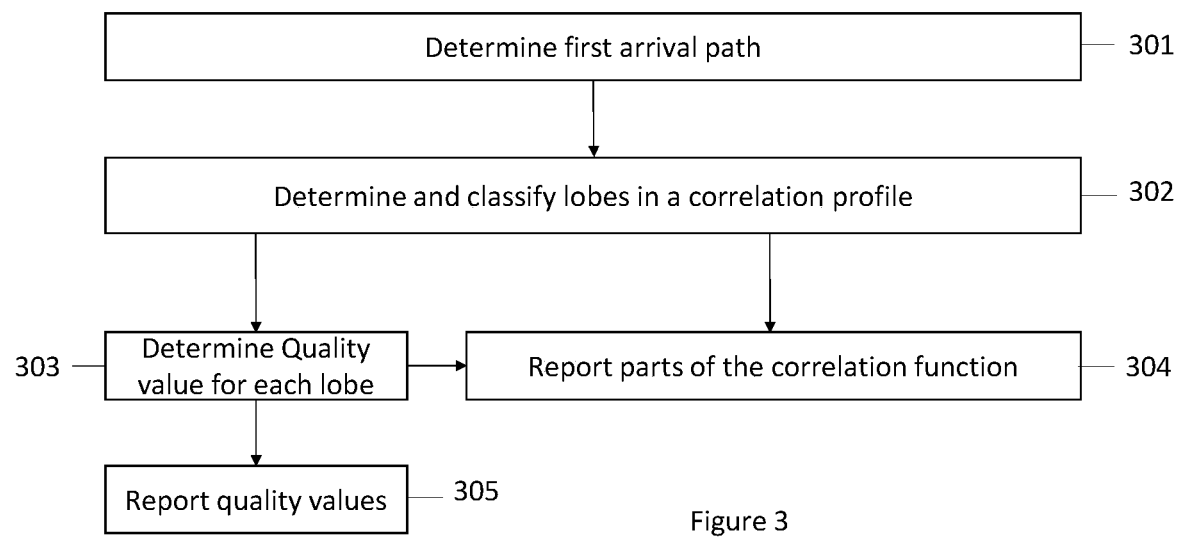
FIG. 3 depicts a procedure for reporting information of a correlation function and quality values.

There are multiple methods for determining a TOA measurement. One approach is to determine a Channel Impulse Response (CIR) and predict or estimate the first lobe including a First Arrival Path (FAP) of the CIR. The UE 201 or the measuring device is configured to detect the FAP which is the first lobe detected above a predefined or given threshold. Before describing details of the present embodiments, FIG. 3 illustrates the main steps performed according the present invention.

In step 301, the first arrival path (FAP) is determined by the measuring device (e.g. UE 201).

The FAP is the first lobe detected above a predefined or given threshold.

In step 302, the lobes are determined and classified in the correlation profile or CIR.

In step 303, the quality values of the lobes are determined.

In step 304, the measuring device is configured to report part of the correlation profiled or CIR to a positioning device.

In step 305, the quality values are reported to the positioning device.

The CIR reporting from the measuring device to the positioning device enables the positioning device to correct or estimate a coarse estimate from the FAP. The measuring device can report part of the complex correlation profile (truncated CIR).

Resource Configuration Information

The measuring device may be configured with a PRS (uplink or downlink) resource set configuration or a PRS resource configuration for downlink and/or uplink channel sounding and/or downlink/uplink-based positioning via higher layer signaling. The resource set configuration may comprise one or more resources where each PRS resource may comprise information on or more ports used.

The following parameters may be semi-statically configured via a higher-layer parameter denoted PRS-Resource:
- time domain behavior of the PRS resource configuration which can be 'periodic' or 'semi-persistent' or 'aperiodic' PRS transmission,
- slot level periodicity and slot level offset for a resource of type periodic or semi-persistent,
- time domain muting pattern and frequency domain position,
- PRS bandwidth As mentioned earlier, the FAP is the first lobe detected above a threshold. According to an embodiment, the threshold may be selected according to an estimated noise floor. The threshold is a compromise between "false detections" (e.g. already correlation peaks resulting from noise or the interference may exceed the threshold) and "missing detections" where the threshold is too high and weak signals cannot be detected. The threshold may be selected according to a maximum value of the correlation (CIR). It may happen that the strongest correlation peak does not represent the direct path but may be useful for a reliable detection of the signal. For the FAP, the first lobe exceeding a threshold is selected.

Another approach is to use a Peak-tracker assisted search. In case of transmissions over multiple time, frequency or antenna ports; the FAP may be monitored for lower threshold values ("tracking threshold"). This allows the selection of a lower threshold and minimizes the false detection probability by using multiple CIR instants to determine the FAP.

Figure 4:
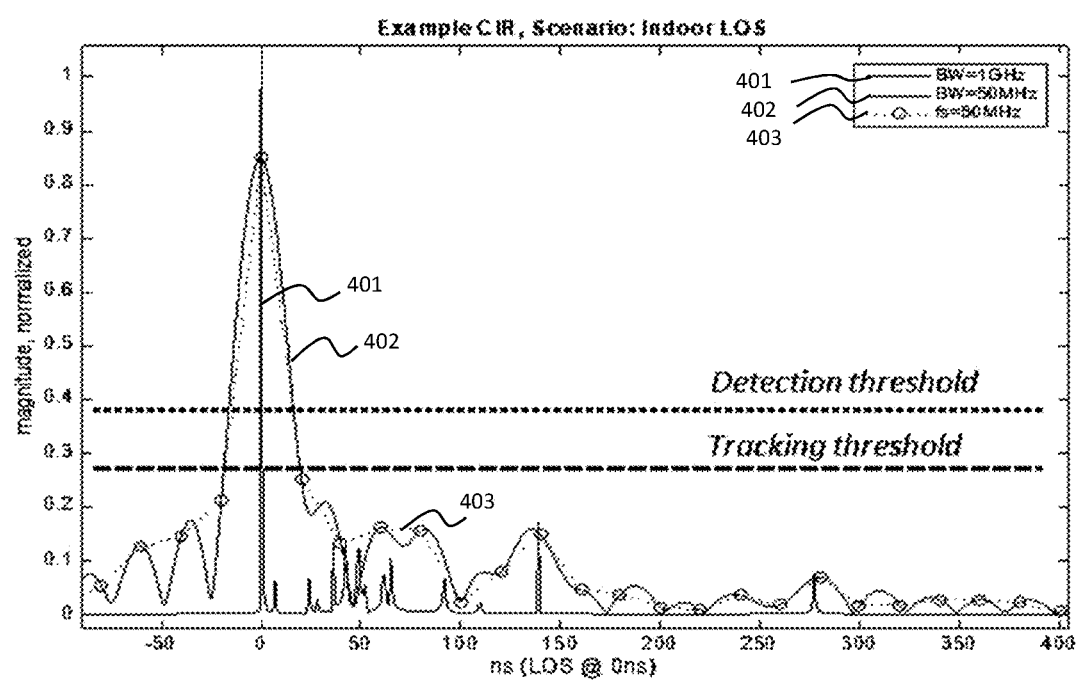
FIG. 4 illustrates an example of a Channel Impulse Response (CIR) for a Line-Of-Sight (LOS) condition where no or minor impairment affect the first arrival path.

FIG. 4 illustrates an example of a CIR profile determined for an indoor LOS scenario. No or minor impairment affect the first peak. Two thresholds are used, a detection threshold and a tracking threshold. The y-axis represents the magnitude, which is normalized, and the x-axis is time in ns. The bandwidths of the CIRs are 1 GHz 401 and 50 MHz 402 and the fs is 50 MHz 403.

Figure 5:
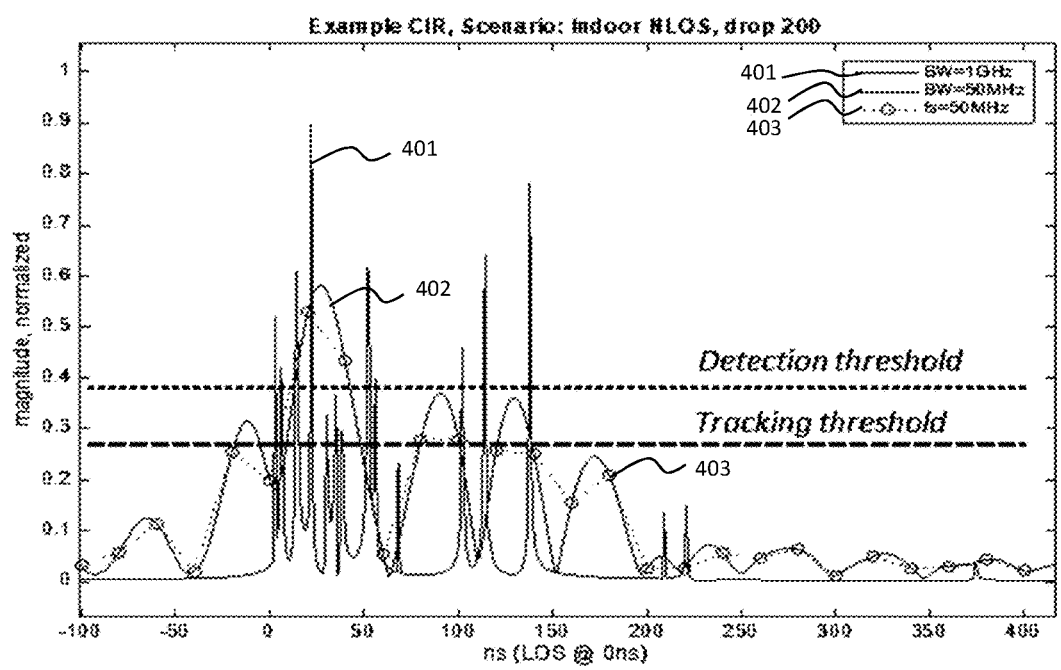
FIG. 5 illustrates an example where the CIR suffers an overlap of several taps in a Non-LOS indoor condition.

FIG. 5 shows another example of a CIR but in an indoor Non-LOS (NLOS) scenario. The same frequencies are used as in FIG. 4. In FIG. 5, the band limited (50 MHz) CIR suffers an overlap of several taps leading to early detections.

Referring back to FIG. 4, the quality of the first lobe is high (i.e. well over the detection threshold). In this case, the UE 201 or the measuring device is configured to estimate the TOA, provided the estimation method or class of the UE is high or the UE is configured by the LMF 205 to estimate the TOA and the reporting to the LMF can be reduced to a minimum window size around the first lobe. As an example, the device may apply an advanced algorithm to estimate the TOA.

On the other hand, if the quality of the first lobe is low, as is the case in FIG. 5, the UE 201 may not be able to estimate the TOA with good performance. In this case, the correlation reporting window class needs to be configured to be long size.

According to an embodiment, the quality of the lobes may be determined and reported from the measuring device (e.g. UE 201) to the LMF 205. The quality may be used to determine which method to apply for the TOA estimation and for the reporting configuration.

According to an embodiment, for reporting the CIR or the correlation function, the measuring device is configured to report information on a truncated part of the CIR i.e. only a part of the CIR. For the TOA estimation, the FAP is a relevant information. The measuring device may report only the correlation function or the CIR, around the FAP or around the first lobe including the FAP.

An advantage with this embodiment, is that the amount of data used for the reporting is reduced significantly to achieve the same performance compared to complete CIR reporting. This also means that less resources are used for reporting the information on the truncated CIR.

As an example, instead of using the full correlation function (or full CIR) for further processing, only a small part (e.g. 13 samples) are used for further processing.

Figure 6:
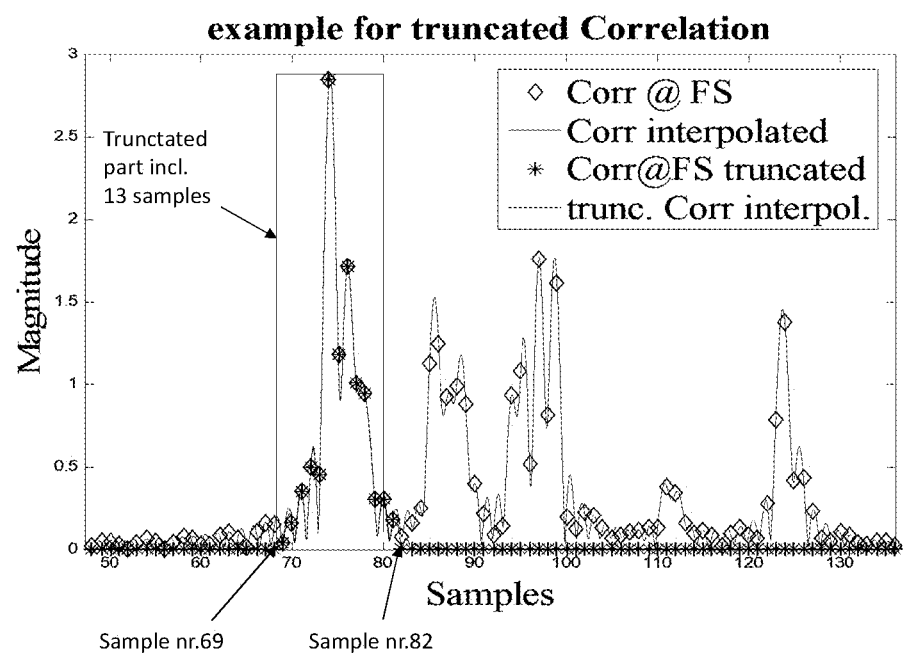
FIG. 6 illustrates an example of a truncated correlation.

The principle is shown in FIG. 6. From the full correlation function ("0") only 13 samples of the truncated CIR ("*" between 69 and 82 samples) are used. In the figure, the samples that are not used are not reported. Hence the measuring device may be configured to report a window size including the 13 samples to the LMF for further processing. The number of selected samples is either preconfigured from the positioning device or determined by the measurement device based on the correlation quality information determined before, within and/or after the lobe.

It should be noted that FIG. 6 shows the magnitude instead of the I and Q components of the complex valued correlation function. The complex value I and Q are used as an input for the interpolation filter at the positioning device. By reporting the interpolated truncated CIR the reported information as well as the measurement device complexity is reduced. To better visualize the characteristics of the correlation, the figure includes also the re-sampled correlation function using an up-sampling factor of 32.

For the selection of the relevant samples, a coarse ToA estimator may be used. The coarse ToA-estimator is configured to predict or estimate the FAP with a resolution of 1/sampling_frequency. This estimate defines the window for the correlation function (or CIR) sent to the LMF or positioning device for further processing. As an example, 13 samples of the correlation function around the FAP are selected for further processing, whereby 3 samples before the lobe start and 9 samples after the lobe start to include the information near reflections. According to an embodiment, the choice of the truncated window configuration including the start position and window size are either preconfigured from the positioning device, or determined by the measurement device based on the correlation quality information determined before, within and/or after the lobe.

Figure 7:
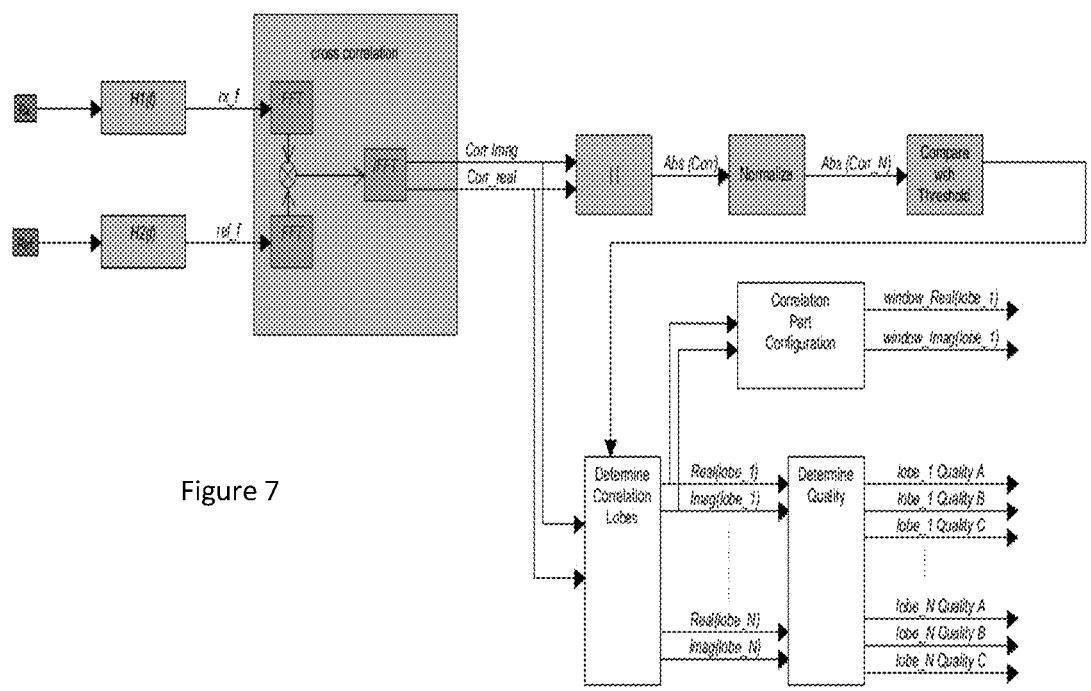
FIG. 7 depicts a block diagram used for determining window correlation and quality values for reporting.

Referring to FIG. 7, there is illustrated a block diagram that may be used for determining the quality of the window correlation for the reporting of the truncated CIR part according to an embodiment. The block diagram may be implemented in the measuring device. The cross-correlation procedure is applied for the received input signal Rx (or rx_t) with the Ref (or ref_x) signal of a configured PRS resource. The filters H1(f) and H2(f) are optional. The magnitude of the correlation output is normalized, and threshold(s) detection can be performed. The correlation lobes detected above the threshold are used as an input to determine the correlation lobes in addition to the I and Q components of the correlation output. The function "Determine Correlation Lobes" determines the part belonging of one or more lobes (lobe1, lobe2, . . . , lobeN). Depending on the configuration, at least the first lobe (the I and Q components of lobe1) is truncated and reported to the positioning device.

The measurement device can determine and report the quality of one or more lobes. If configured, the measuring device can interrupt the truncated CIR reporting procedure depending on the measurement quality. For this case, the determined quality of the lobe is above a certain value and the measurement device can determine the TOA measurement with sufficient accuracy (i.e. without the assistance of the positioning unit).

In order to support the truncated CIR part reporting or the correlation window reporting, the protocol used for the reporting may be extended.

As an example, the message or the IE (Information Element) related to the truncated CIR reporting may include:
  WindowStartPos: start position relative to the coarse TOA of the first arrival path (resolution in samples)
  $ToA_{coarse}$: ToA estimate (related to measurement method used i.e. OTDOA, UTDOA, RTT (TA))
    Resolution nominal sampling frequency according the selected bandwidth or higher.
  WindowSize: Comprising the Number of complex valued samples transmitted
  corrDataList: comprising the complex values for a correlation instant within the window
  antennaPortIndex: indication for the Index of the antenna port
  noofantennaPorts: number of antenna ports to report The Correlation Window IE is depicted below:

| Correlation Window Information Element |
| --- |
| The Information Element CorrPartReport is signaled by the measuring device to provide a window of the measured correlation profile (or CIR). The correlation profile window is reported with relative to the first arrival path according to the provided WindowStartPos value.<br>-- ASN1START<br>CorrPartReport-r17 ::= SEQUENCE {<br>   WindowStartPos-r17        INTEGER (−50..452),<br>   WindowSize-r17 INTEGER (3..100),<br>   PartCIRWindow::= SEQUENCE (SIZE(1.. WindowSize)) OF corrData-r17<br>   antennaPortIndex            INTEGER (0..31),      -- Optional<br>   noofantennaPorts            INTEGER (0..7)       -- Optional<br>}<br>corrDataList-r17 ::= SEQUENCE {<br>   realCorrValue-r17           INTEGER (−2048.. 2047),<br>   imagCorrValue-r17          INTEGER (−2048.. 2047),<br>   ...<br>}<br>-- ASN1STOP |

The IE message may be reported by the measuring device. The measuring device may be a TRP in UTDOA and RTT, signaling the message over higher layer, like NRPPa, or over the user plane, to the positioning device (e.g. the location/positioning device or LMF). The measuring device may be the target UE in an OTDOA and RTT, signaling the message over LPP or the user plane, to the location/positioning device or LMF.

The signaling procedure may thus comprise the following components:
- Measuring or measurement device (e.g. the UE)
- LMF or a location/positioning device According to an embodiment, the LMF (or positioning device) may be configured to request capabilities of the measuring device. The capabilities may indicate if the measuring device supports CIR reporting. The capabilities may include additional features such as a number of antenna ports used and also a measurement history. The measuring device provides information on its capabilities based on the request.

According to an embodiment, the LMF provides the measuring device with configuration settings for the reporting the CIR and for the reporting of the quality information of e.g. the detected lobes. The measuring device provides the LMF with a CIR report (e.g. CorrPartReport-r17) based on the configuration setting received from the LMF. CorrPartReport-r17 is included in the Correlation Window IE described earlier.

According to an embodiment, in case of CIR reporting for sidelink, in a D2D or V2V scenario, the network node (e.g. the LMF, a local LMF at the gNB or the gNB) may coordinate the reporting confirmation disclosed earlier.

According to an embodiment, the measuring device may report the full complex-valued time response. In this case the IFFT (Inverse Fast Fourier Transform) is calculated by the measuring device and the full complex valued time domain CIR is determined at a sampling frequency according to the used bandwidth and is reported.

According to another embodiment, the full complex-valued frequency response may be reported. In this case, the frequency response is calculated first, and the time-domain correlation function is generated by the IFFT of the frequency response. The TOA may be estimated from the full frequency response together with the OFDM modulator symbol timing. Reporting the full (complex-valued) frequency response may however require a significant data rate (e.g. 4096 I/Q samples corresponding to the NFFT length, 16 bit per sample which gives 131 kbit per demodulated symbol). Assuming the measuring device is equipped with several receive antenna ports, the frequency response may be reported for all antenna ports to allow further processing.

According to another embodiment, peaks of the time domain CIR may be determined/defined and further extended by including the complex correlation profile.

According to yet another embodiment, the information on the truncated part of the CIR may be combined with signal quality parameters. The measuring device may report a first estimated TOA together with a used estimation class.

Figure 8:
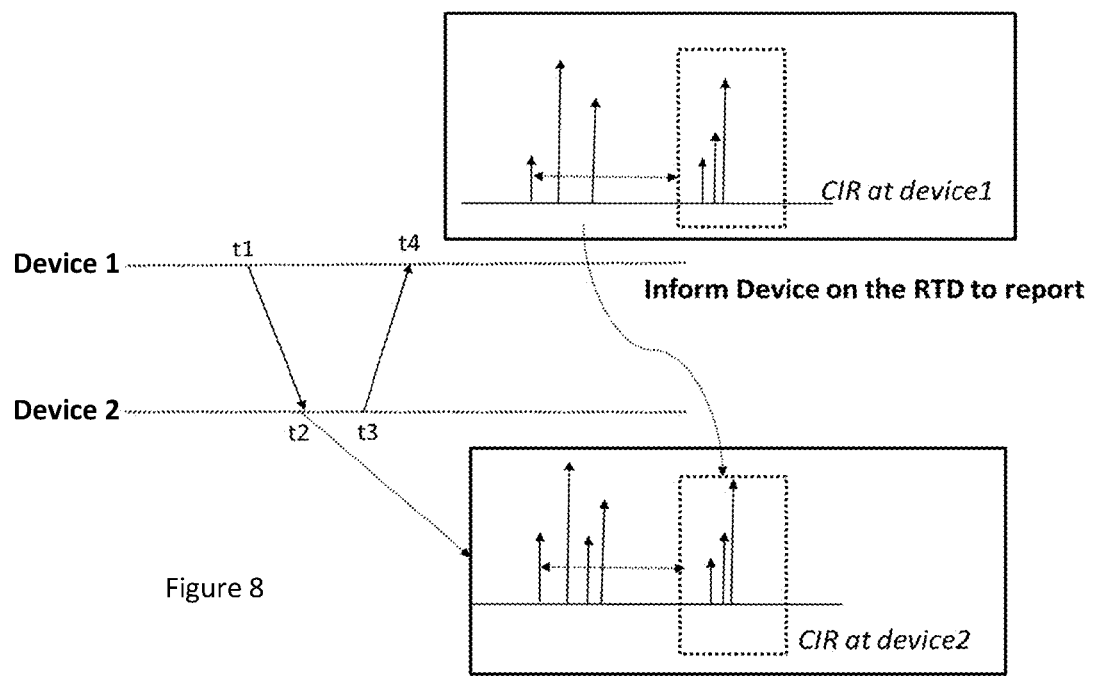
FIG. 8 depicts a scenario for reporting RTD measurements involving two devices.

In the following the RTT multipath reporting procedure is described. In RTT, the devices or UEs, also called ranging devices, are assumed to share, or experience the same channel characteristics over a measurement period. The ranging devices send signals to each other. The signal transmission times (t1 and t3) and reception times (t2 and t4) are shown in FIG. 8. As shown, device 1 transmits a signal to device 2 at time t1. At time t3, device 2 sends a signal to device 1 and at time t4, device 1 receives the signal. The reception times t2 and t4 are given by:

$$t2 = t1 + TOF$$

$$t4 = t3 + TOF$$

where TOF (or tof) is the Time-Of-Flight, i.e. the time it takes for the signal to travel from a device to the other.

The RTT time or the RTD time is calculated as follows:

$$rtt = tof + tof = (t4 - t3) + (t2 - t1) = (t4 - t1) - (t3 - t2)$$

The following procedure is proposed to make use of the multipath propagation information: According to an embodiment one RTT device is configured to measure the CIR and is further configured to measure at least one relative time from the FAP to one or more clusters at one or more time instants:

$$t4_{MP} = t4 + t_{c1}$$

where $t_{c1}$ represents a time delay to the FAP.

The other device (e.g. a reception point, a UE device in sidelink ranging or the LMF) is configured to request the relative time measurements to the identified clusters by providing the relative time to the first path and optionally the signal amplitude and the lobe quality. This is shown in FIG. 8 with the arrow from device 1 to device 2.

Based on the information received from device 1, device 2 is configured to measure the relative time $t2_{MP}$ given by:

$$t2_{MP} = t2 + t_{c1}$$

The device has an additional information which it may use to better estimate the range distance and can weight the estimate based on the quality information.

Multiple Reporting Over Multiple Measurements

In one aspect, the movement of a target object/device may cause, in some scenarios, the LOS to fade, for example if a car moves between a target device and the TRP, or the LOS or the first path is attenuated or cancelled out due to early clusters. In such a scenario, the measuring device may report a late TOA causing additional errors on the total delay.

The CIR of a multipath channel for a stationary environment can be represented as:

$$h(\tau) = \sum_{i=1}^{I} \alpha_i \delta(\tau - \tau_i)$$

where $\alpha_i$ is the relative attenuation which corresponds to the amplitude of the CIR peaks, $\delta$ is the Dirac delta function and $\tau_i$ is the delay of the i-th multipath component. Because a target device is moving, the CIR is time-variant, hence CIR is then given by:

$$h(t, \tau) = \sum_{i=1}^{I} a_i(t, \tau) \delta(\tau - \tau_i(t)) e^{-i\omega t + \phi}$$

where $\omega$ and $\phi$ are the phase changes due to the different arriving time and due to reflections caused by clusters.

Figure 9:
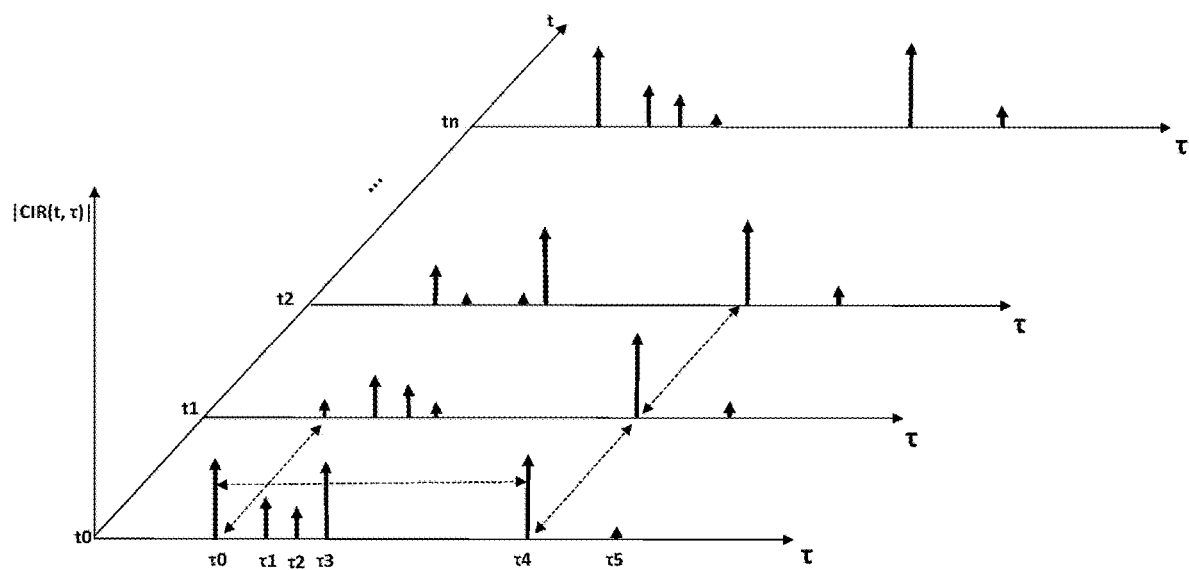
FIG. 9 illustrates absolute correlation for a UE at different time instants.

The multipath over a deterministic time interval comprising one or more time instants can be separated into time-varying clusters and durable clusters. This can be interpreted as that the measuring/measurement device receives one or more multipath components from the same reflecting cluster over multiple instants. FIG. 9 illustrates an absolute CIR as a function of time and delay. As shown, the multipath at delay $\tau_4$ stays valid over multiple times instants $t_1, t_2, \ldots t_n$. over a configured PRS resource.

In accordance with an embodiment, when the resource of the configured PRS is periodic or semi-persistent or aperiodic, the measuring device is configured to determine the TOA of additional clusters within a CIR measurement.

In another embodiment, the persistency of the clusters is observed over more than one time instant. The measuring device is configured to use the information in the configured PRS resource or resource set to predict the TOA related to the FAP ($\tau_0$ for i=0) and/or cluster information $\tau_i$ for i>0).

The measuring device may determine a predicted value of TOA, denoted $\widehat{toa_{(t_m, c_i)}}$ corresponding to a time instant $t_m$ and cluster index $c_i$ measured at $t_n$, and expressed as:

$$\widehat{toa_{(t_m, c_i)}} = toa_{(t_{n-1}, c_i)} - (t_n - t_m)$$

The clusters may be classified according to the quality of the lobes.

Based on this information, the measuring device may be configured to report the truncated part of the CIR and/or a truncated part corresponding to the clusters.

Figure 10:
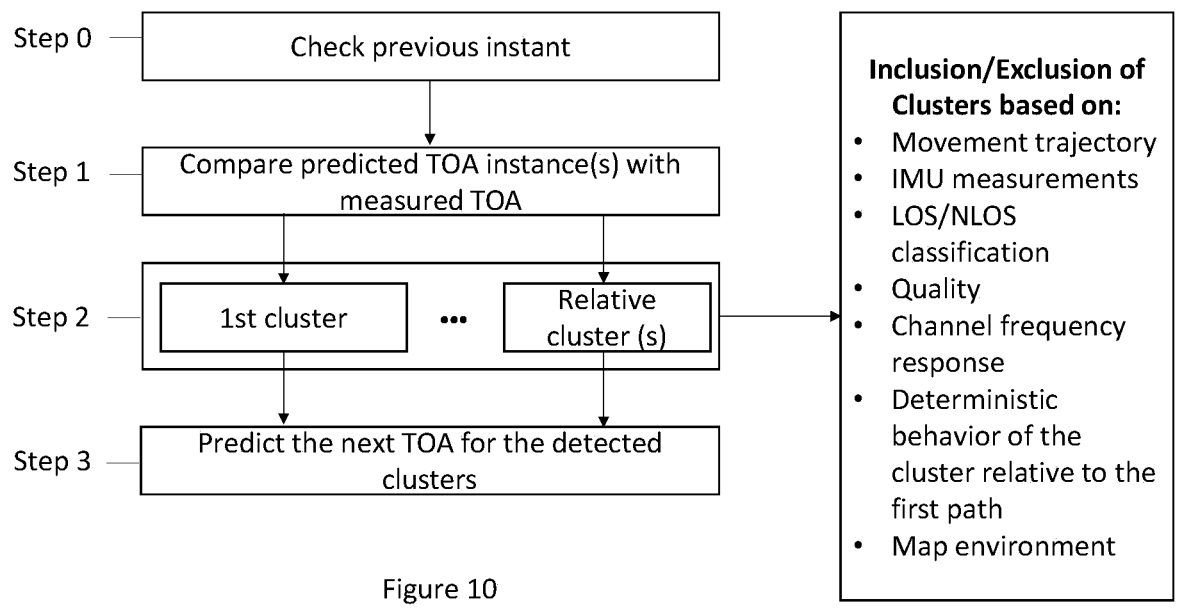
FIG. 10 illustrates a procedure for multipath reporting over multiple measurements.

The use of the cluster information and the periodicity of the PRS signal enables the positioning device (LMF) to predict the TOA from the late clusters. Using tracking procedure over multiple snapshots or time instants, the LMF can resolve the TOA estimation error by performing the procedure shown in FIG. 10. The procedure includes the following steps:

Step 0: The measuring device is configured to check previous instants of the TOA and cluster information from the previous instants, if these are available.

Step 1: The measuring device is configured to compare the predicted TOA instance(s) with the measured TOA. As an example, the measuring device is configured to compare the predicted TOA instances and the cluster relative position w.r.t. FAP. The information providing the continuity over multiple snapshots assists the computing/measuring device and/ or the positioning device to make efficient use of the cluster information to estimate an accurate TOA and to reduce the reporting for the measuring device, for example avoid moving reflectors, report fixed clusters even with low power.

Step 2: Based on the information derived in step 1, and additional information e.g. a known trajectory like a train track or derived from an inertial measurement unit (IMU) information which may comprise accelerometers and gyroscopes, quality measurements of detected lobes (and the deterministic behavior over time of certain clusters) can be identified, and clusters can be classified. The clusters may be classified based on the persistency of the clusters in the CIR and based on the quality information $Quality_A$, $Quality_B$, or $Quality_C$ which are described below in more details.

Step 3: The measuring device is configured to predict/estimate the (next) TOA of the clusters including the first lobe.

Using deep learning, one could both track the peaks/TOAs across one or more windows, as well as set the overall features of one or more windows in relation to previous or future windows. The neural networks learn to correlate the contribution of each numeric or pictographically represented value to using temporal relationships to more accurately predict future windows and remove noise. Here, temporal, and causal relationships of individual values within a window are learned, as well as relationships of individual values between consecutive or widely spaced windows can be learned by means of simple recurrent neural networks.

One could still classify signal characteristics in many places by means of deep learning or machine learning, or track difficultly recognizable relationships, especially over time or causality, and thus predict them more precisely. Another approach would be to use auto compression methods, e.g. beta-vae of deep learning to get and keep only essential signal information.

As previously described different quality parameters can be derived on reference signals such as PRS signals or any other reference signal. These quality parameters may be reported from the measuring device to the positioning device.

Figure 11:
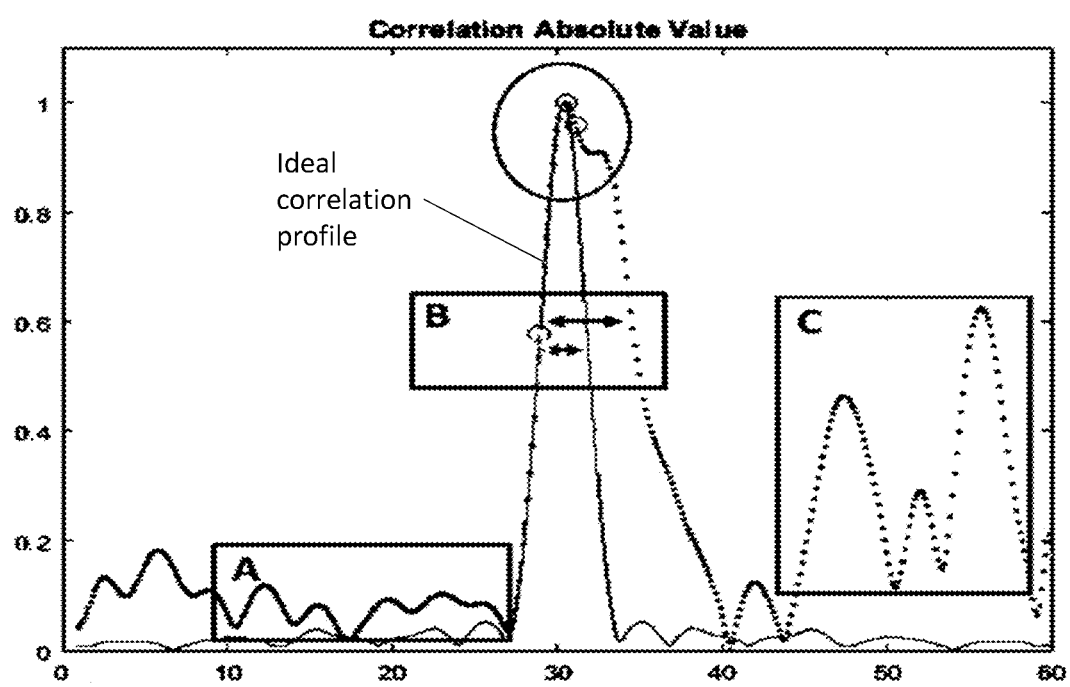
FIG. 11 depicts an example of a correlation profile.

With reference to FIG. 11 depicting a calculated or measured correction profile or CIR, three different quality parameters may be determined and reported to the positioning device. In FIG. 11, three parts A, B and C are shown. Part B represents the truncated part of the CIR including the main lobe. Part A represents a CIR part before the main lobe and part C represents later clusters i.e. after the main lobe.

The quality parameters for the different parts can be determined or measured as follows:

Part (A): Before the Main/First Lobe

This measurement applies mainly on the first lobe however it can be useful to determine the cluster quality for example when late clusters induce large delay spread channel characteristics.

According to an embodiment, the quality parameter, denoted Quality$_A$, gives an indication on the noise and interference level and can be measured according to:

$$Quality_A = 20*\log 10\left(\frac{\text{Amplitude of lobe maximum}}{\frac{\sum_{k=0}^{m}\text{amplitude of preceding } corrindx}{n}}\right)$$

Where, the nominator "Amplitude of lobe maximum" can be selected as to the amplitude of the maximum lobe of the correlation profile or the CIR or to a peak corresponding the first lobe. The denominator is the average of multiple samples to provide a better representation of the interference and noise floor. "amplitude of preceding corrindx" corresponds to at least one amplitude of at least one lobe in the CIR part (part A) preceding the truncated part of the CIR part (part B).

Part (B) Quality$_B$: Within the Main Lobe

The characteristics of the lobe can give, in many scenarios, an indication on the CIR characteristics and the resulting quality of the TOA to be expected. The ideal correlation profile is depicted. No channel disturbance as multipath, noise adds on the signal. The dot lines, in part B, represent the received signal where the reflection cause the first lobe to go wider (broader arrow) and hence adds an offset on the estimated TOA.

According to an embodiment, the measuring device may be configured to measure the quality related to the lobe by, for example measuring the distance between the rising and falling edge of the detected lobe and determine the quality value by comparing this value with the ideal channel characteristics value. The quality value within the main lobe of the truncated part of the CIR gives a direct indication on the multipath effect on the measurement and is directly related with the expected TOA error. One example is that the quality value indicates an error in higher resolution than the signal sampling rate. As an example, if the signal bandwidth is 50 MHz and the correlation sampling rate is T=1/(15000*8192) seconds, the error range can be represented by Tu where Tu=0.1*T. The quality parameter can be given as:

Quality$_B$=Expected error in T$_u$

The value can be averaged or reported separately per antenna port of the measuring device to the positioning device.

Part (C) Quality$_C$: After The Lobe

The last quality parameter does not directly influence the measured TOA. But it gives an indication on the channel on the late clusters. This can give a prediction to the location server (LMF or LS) on the channel environment the target device or the measuring device experiences. According to an embodiment, the quality value Quality$_C$ can be determined as a function of:
the power of the CIR in "part C" relative to the power in the truncated part "part B". In some scenarios more than one "part C" can be used, wherein the quality is determined by averaging the parts and optionally weighting them with a quality depending on the lobe strength.
As a function of the root-mean-square (RMS) delay spread of the truncated part of the CIR, part B.

The quality parameter may also be determined over multiple measurements and reported. As an example, the measuring device can average the quality over multiple instants or combine the quality with the variance of the TOA or RSTD or/and phase difference measurements.

The reporting quality resolution, unlike the case for LTE [1] needs to be flexible to adjust diverse accuracy targets. For example, a device being localized within 50 meters accuracy does not need a quality with centimeters resolution which also could be the resolution needed for high accuracy applications. The reporting accuracy of RSTD measurements for OTDOA, RTOA measurements for UTDOA or Rx-Tx for RTT (Time advance type 1 and 2) depend on several factors such as signal bandwidth, estimation class of the receiver and requested Quality-of-Service (QoS) [4].

According to some embodiments, a method performed by a measuring device configured to communicate with the positioning device comprises:
determining a cross-correlation (or CIR) between a received signal and transmitted reference signal; determining a measurement quality based on said cross-correlation and; reporting a quality value and a resolution value of at least said measurement to the positioning device for enabling the positioning device to determine measurement quality from a reporting granularity of said at least one measurement and the reported quality value and the resolution value.

The reporting of the quality value and the resolution value may be of at least a TOA estimate/measurement, RSTD measurement or a TA measurement.

As an example, the quality value and the resolution of the measurement based or relative to reporting of the TOA measurement including RSTD, RTOA, TA and Rx-Tx measurements, may be reported. The quality may be defined with a resolution value where:
The quality value may be a bit string specifying a range (e.g. 1 to 2 bits) and it determines the uncertainty of the TOA measurement with regards the resolution and reporting accuracy (N*Tc). As an example, a PRS can have a 4 Tc TOA reporting resolution. Tc is the time unit for the New Radio (NR) system and is defined in relation to the maximum subcarrier spacing and NFFT length.
The quality resolution (R) may be a bit spring defining a factor used to define resolution steps between quality values and allows higher (R=0.5, 025) or lower quality granularity reporting (for R>1) compared to the reporting resolution.

As an example, for a PRS configuration with subcarrier spacing of 120 kHz and an NFFT length of 4096, the resulting RSTD Reporting granularity=4 Tc; Quality value=4; Resolution=0.5. The quality=Value* reporting-Granularity*0.5=8 Tc, which correspond to an uncertainty of 1.2 meters.

If the error exceeds the maximum range, the measuring device may set a flag indicating that the uncertainty exceeds the range, or the device may report the largest uncertainty measurement.

According to an embodiment, the quality value may be determined by using at least one of the parameters, Quality$_A$, Quality$_B$, Quality$_C$ previously presented. The quality value is reported together with at least one resolution value of the at least one measurement to the positioning device.

For example, for Quality$_A$, the "Amplitude of lobe maximum" corresponds to the amplitude of the maximum lobe of the cross-correlation or a peak corresponding to a first/main lobe of the cross-correlation. The "amplitude of preceding corrindx" may correspond to at least one amplitude of at least one value in a part of the cross-correlation (or CIR) preceding the part of the cross-correlation including the first lobe.

For $Quality_B$, the measurement device may measure a distance between a rising edge and a falling edge of a detected first lobe in the cross-correlation and determines a quality value within the first lobe; wherein the quality value indicates an expected error in a TOA estimate. The measuring device then reports the quality value and a resolution value to the positioning device.

For $Quality_B$, the measurement device may determine a channel quality as a function in a part of the cross-correlation subsequent to the cross-correlation part that includes the first/main lobe, relative the power in the cross-correlation part including the main lobe and/or as a function of a root-mean-square delay spread of the cross-correlation part including the main lobe. The measurement device may then report the quality value and a resolution value to the positioning device.

The quality value parameters may be determined over multiple measurements and reported together with at least one resolution value to the positioning device. As an example, the measurement device can average the quality value over multiple instants or combine the quality value with the variance of the TOA or RSTD or TA and report the quality value and a resolution value to the positioning device.

Figure 12:
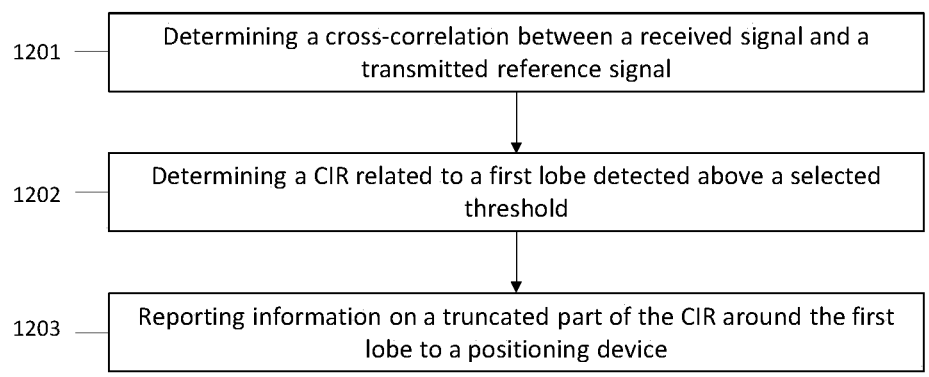
FIG. 12 depicts a flowchart of a method performed by a measuring device according to some embodiments herein.

FIG. 12 illustrates some steps performed by a measuring device configured to communicate with a positioning device, according to previously described embodiments. The steps include: (1201) determining a cross-correlation between a received signal and a transmitted reference signal;

(1202) determining a channel impulse response (CIR) of the cross-correlation, related to a first lobe detected above a selected threshold in said CIR; and (1203) reporting to the positioning device, information on a truncated part of the CIR around the first lobe for enabling the positioning device to correct or estimate a measurement related to a distance between a transmitter and the measuring device and/or a distance between at least one reflecting cluster and the measuring device.

The transmitter may be at least one TRP and/or at least one radio base station or gNB, and the reference signal may be a PRS.

According to an embodiment, the information on the truncated part of the CIR comprises complex-valued out of the CIR including a real and imaginary output of the CIR around said first lobe. The first lobe includes a FAP and the truncated part of the CIR includes a selected number of samples around the first arrival path in the CIR. As previously described, the information on the truncated part of the CIR is reported to the positioning device in a message including at least a start position relative a coarse TOA estimate of the first arrival path and a number of the complex valued of the selected samples; and a number of antennas used for said reporting.

According to an embodiment, the threshold is selected according to an estimated noise floor or according to a maximum value of the correlation.

According to an embodiment the measuring device receives from the positioning device, a request for capabilities of the measuring device and the measuring device provides the positioning device with the requested capabilities including information on at least a number of antenna ports used for reporting the information on the truncated part of the CIR.

According to an embodiment, the method performed by the measuring device comprises reporting a signal quality parameter including an indication on a noise and interference level, measured according to:

$$Quality_A = 20 * \log 10 \left( \frac{\text{Amplitude of lobe maximum}}{\frac{\sum_{k=0}^{n} \text{amplitude of preceding } corrindx}{n}} \right)$$

wherein, Amplitude of lobe maximum corresponds to the amplitude of the maximum lobe of the CIR or to a peak corresponding to the first lobe;

amplitude of preceding corrindx: corresponds to at least one amplitude of at least one value in a CIR part preceding the truncated part of the CIR and corrindx is a sample index of the CIR;

n is an average number of samples.

The method further comprising measuring a distance between a rising edge and a falling edge of the detected first lobe in the truncated part of the CIR, and determining a quality value within the first lobe; wherein the quality value indicates an expected error in a TOA estimate, and reporting the quality value to the positioning device.

According to an embodiment, the method comprises measuring a relative time from a first arrival path to said at least one reflecting cluster at one or more time instants, wherein the relative time is given by:

$$t4_{MP} = t4 + t_{c1}$$

where t4 is a signal reception time at the measuring device and $t_{c1}$ is a time delay, caused by at least one cluster, to the first arrival path.

According to another embodiment, the method comprises receiving a request from the positioning device requesting relative time measurements to identified clusters(s) by providing at least the relative time to the first path, for enabling the positioning device to compute a relative time given by:

$$t2_{MP} = t2 + t_{c1}$$

where t2 is a signal reception time at the positioning device and $t_{c1}$ is the time delay, caused by at least one cluster, to the first arrival path.

The method further comprises checking or analyzing previous instants of a time-of-arrival, TOA, and cluster information from the previous instants; comparing predicted TOA instances with at least one measured TOA; classifying clusters based on the persistency of the clusters in the CIR and based on the quality information $Quality_A$, $Quality_B$, or $Quality_C$; and predicting a next TOA estimate for at least one cluster including the first lobe.

Figure 13:
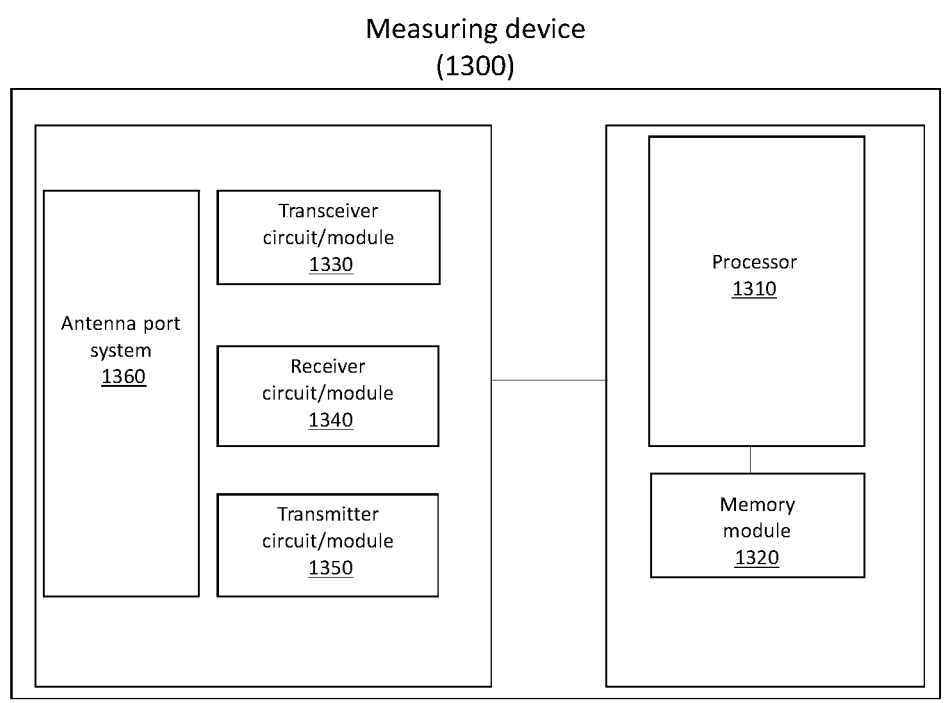
FIG. 13 illustrates a simplified block diagram of a measuring device according to some embodiments herein.

In order to perform the previously described process or method steps related to measuring device (e.g. a UE), embodiments herein include a measuring device 1300. As shown in FIG. 13, the measuring device 1300 comprises a processor 1310 or processing circuit or a processing module or a processor or means 1310; a receiver circuit or receiver module 1340; a transmitter circuit or transmitter module 1350; a memory module 1320 a transceiver circuit or transceiver module 1330 which may include the transmitter circuit 1350 and the receiver circuit 1340. The measuring device 1300 further comprises an antenna system 1360 which includes antenna circuitry for transmitting and receiving signals to/from at least the positioning device and the TPR and/or gNBs.

The measuring device 1300 may belong to any radio access technology including 4G or LTE, LTE-A, 5G, WLAN, and WiMax etc.

The processing module/circuit 1310 includes a processor, microprocessor, an application specific integrated circuit (ASIC), field programmable gate array (FPGA), or the like, and may be referred to as the "processor 1310." The processor 1310 controls the operation of the measuring device 800 and its components. Memory (circuit or module) 1320 includes a random-access memory (RAM), a read only memory (ROM), and/or another type of memory to store data and instructions that may be used by processor 1310. In general, it will be understood that the measuring device 1300 in one or more embodiments includes fixed or programmed circuitry that is configured to carry out the operations in any of the embodiments disclosed herein.

In at least one such example, the measuring device 1300 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed herein including anyone of method steps already described. Further, it will be appreciated that the measuring device 1300 may comprise additional components not shown in FIG. 13.

The measuring device 1300 configured to communicate with a positioning device, is adapted to perform the subject matter disclosed herein. In an embodiment, the measuring device may be configured to communicate with the positioning device over the LPP interface. In this case the device is a UE.

In other embodiment, the measuring device may communicate with the positioning device over a sidelink interface. In this case the measuring device is a UE communicating in a D2D or V2V scenario with another device.

In another embodiment, the measuring device may be a network node (TRP or gNB) configured to communication with the positioning device over the NRPPa interface.

There is also provided a computer program comprising instructions which when executed by the processor of the measuring device cause the processor to carry out the method according to the subject matter disclosed herein.

A carrier is also provided containing the computer program wherein the carrier is one of a computer readable storage medium, an electronic signal or a radio signal.

Figure 14:
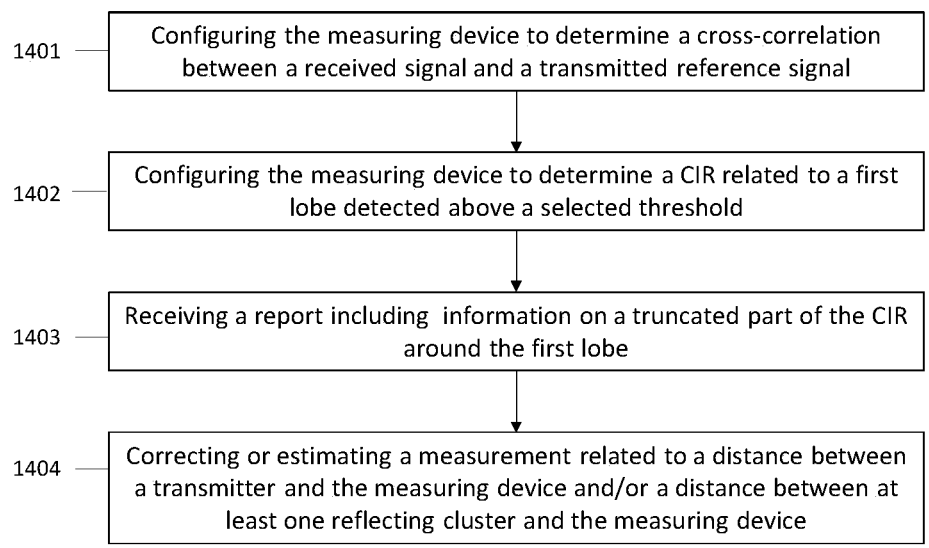
FIG. 14 depicts a flowchart of a method performed by a positioning device according to some embodiments herein.

Referring to FIG. 14, there is illustrated a flowchart of a method performed by a positioning device according to previously described embodiments.

The method comprises:

(1401) configuring the measuring device to determine a cross-correlation between a received reference signal received by the measuring device and a transmitted reference signal;

(1402) configuring the measuring device to determine a channel impulse response, CIR, of the cross-correlation, related to a first lobe detected above a selected threshold in said CIR;

(1403) receiving from the measuring device a report including information on a truncated part of the CIR around the first lobe; and (1403) correcting or estimating a measurement related to a distance between a transmitter and the measuring device and/or a distance between at least one reflecting cluster and the measuring device.

As previously described, the information on the truncated part comprises complex valued out of the CIR including a real and imaginary output of the CIR around said first lobe. The first lobe includes a first arrival path and the truncated part of the CIR includes a selected number of samples around the first arrival path in the CIR. Further, the information on the truncated part of the CIR is received in a message including at least a start position relative a coarse time-of-arrival, TOA, estimate of the first arrival path and a number of the complex valued of the selected samples; and a number of antennas used for said reporting.

According to an embodiment, the method comprises receiving information on the complex valued time domain CIR at a sampling frequency according to a used bandwidth.

According to an embodiment, the method further comprises receiving a signal quality parameter $Quality_A$ including an indication on a noise and interference level, as previously presented. According to another embodiment, the method comprises a quality value parameter from the measuring device, which quality value parameter is determined by measuring a distance between a rising edge and a falling edge of the detected first lobe in the truncated part of the CIR, and by determining a quality value within the first lobe; wherein the quality value indicates an expected error in a TOA estimate. According to another embodiment, the method comprises receiving a quality value from the measuring device, which quality value is a function of a power in a part of the CIR subsequent to the truncated part relative the power in the truncated part of the CIR and/or as a function of a root-mean-square delay spread of the truncated part of the CIR. According to an embodiment, the method comprises receiving from the measuring device a quality value and a resolution value of at least one reference signal time difference measurement conducted on at least one received reference signal relative to a reporting of at least one TOA estimate.

According to an embodiment, the method comprises transmitting a request to the measuring device, requesting measurement of a relative time from a first arrival path to said at least one reflecting cluster at one or more time instants. The method further comprises transmitting a request to the measuring device, requesting relative time measurements to identified clusters(s) by providing at least the relative time to the first path, for enabling computing a relative time.

In order to perform the method steps previously described, there is also provided a positioning device configured to communication with a measuring device. The positioning device may be a LMF or any suitable network node including the function of the LMF. The positioning device comprises a processor and a memory containing instructions executable by the processor whereby the positioning device is operative to perform anyone of the subject-matter disclosed herein.

Figure 15:
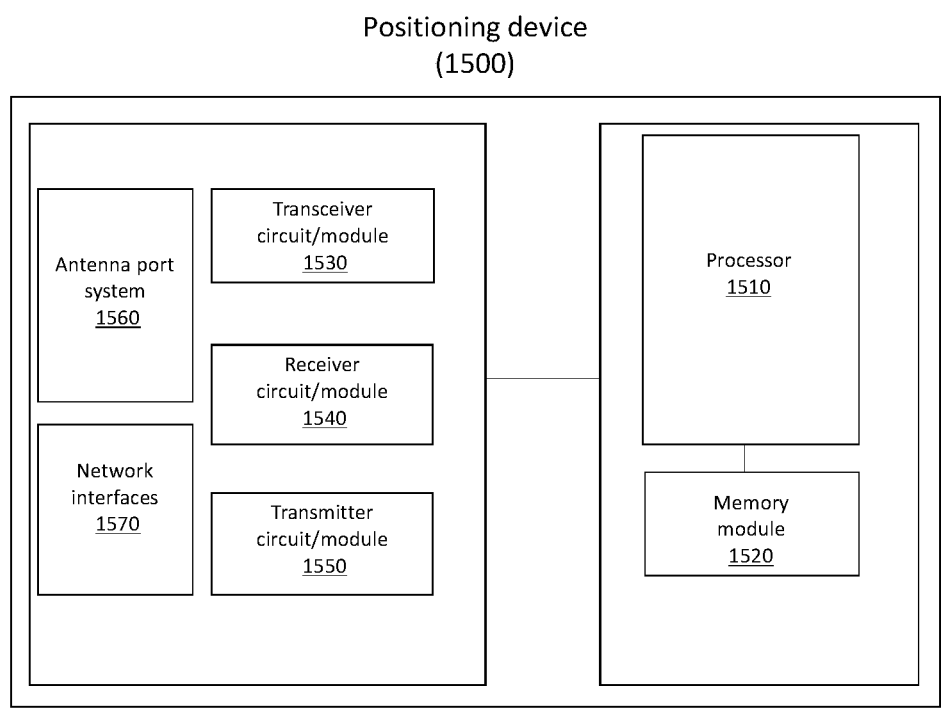
FIG. 15 illustrates a simplified block diagram of a positioning device according to some embodiments herein.

FIG. 15 depicts a simplified block diagram of a positioning device 1500. As shown in FIG. 13, the positioning device 1500, including the function of a LMF, comprises a processor 1510 or processing circuit or a processing module or a processor or means 1510; a receiver circuit or receiver module 1540; a transmitter circuit or transmitter module 1550; a memory module 1520 a transceiver circuit or transceiver module 1530 which may include the transmitter circuit 1550 and the receiver circuit 1540. The positioning device 1500 may further comprise an antenna system 1560 which includes antenna circuitry for transmitting and receiving signals to/from at least the measuring device (e.g. UE) and the TPR and/or gNBs. The positioning device further comprises network interfaces 1570 for interfacing with other network nodes in the radio Access Network (RAN) or in the Core Network (CN).

The positioning device 1500 may belong to any radio access technology including 4G or LTE, LTE-A, 5G, WLAN, and WiMax etc.

There is also provided a computer program comprising instructions which when executed by the processor of the positioning device cause the processor to carry out the method according to the subject matter disclosed herein. A carrier is also provided containing the computer program wherein the carrier is one of a computer readable storage medium, an electronic signal or a radio signal. As previously described, the positioning device maybe a network device including an LMF.

Several advantages achieved by the invention have been demonstrated throughout the disclosure. It is appreciated that the skilled person in the art understands that the exemplary embodiments are not restricted to the examples disclosed in the present disclosure.

An advantage with embodiments herein, is that the amount of data used for the reporting of the CIR related information is reduced significantly. This also means that less resources are used for reporting the information on the truncated CIR.

Another advantage with embodiments herein is to improve the calculation of the position/location of a target device, by providing additional information on the CIR, in addition to the TOA, even in challenging environments.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation.

REFERENCES

[1] 3GPP TS 36.355,"Evolved Universal Terrestrial Radio Access (E-UTRA); LTE Positioning Protocol (LPP)", V15.1.0 (2018- 09)
[2] 3GPP TS 38.455, "NG-RAN; NR Positioning Protocol A (NRPPa)," V 15.1.0 (2018- 09)
[3] WO 2017/030488 A1 or patent family number US 2018/227877 A1
[4] R2-1904402 (3GPP Document)
[5] R1-1909426 (3GPP Document)

The invention claimed is:

1. A method performed by a measuring device configured to communicate with a positioning device, the method comprising:
determining a cross-correlation between a received signal and a transmitted reference signal;
determining a channel impulse response (CIR) of the cross-correlation, related to a first lobe detected above a selected threshold in said CIR; and
reporting a truncated part of the CIR around the first lobe to the positioning device for enabling the positioning device to correct or estimate a measurement related to a distance between a transmitter and the measuring device and/or a distance between at least one reflecting cluster and the measuring device, wherein the first lobe includes a first arrival path, and the truncated part of the CIR includes a selected number of samples around the first arrival path included in the first lobe in the CIR.

2. The method according to claim 1, wherein the truncated part of the CIR comprises complex valued out of the CIR including a real and imaginary output of the CIR around said first lobe.

3. The method according to claim 1, wherein the truncated part of the CIR is reported to the positioning device in a message including at least a start position relative a coarse time-of-arrival (TOA) estimate of the first arrival path and a number of the complex valued of the selected samples; and a number of antennas used for said reporting.

4. The method according to claim 1, further comprising estimating the first arrival path with a resolution of 1/sampling_frequency.

5. The method according to claim 1, wherein the threshold is selected according to an estimated noise floor or according to a maximum value of the correlation.

6. The method according to claim 1, further comprising receiving, from the positioning device, a request for capabilities of the measuring device and providing the positioning device with the requested capabilities including information on at least a number of antenna ports used for reporting the truncated part of the CIR.

7. The method according to claim 2, further comprising reporting information on the complex valued time domain CIR at a sampling frequency according to a used bandwidth.

8. The method according to claim 1, further comprising measuring a relative time from the first arrival path to said at least one reflecting cluster at one or more time instants, wherein the relative time is given by:

$$t4_{MP}=t4+t_{c1}$$

where t4 is a signal reception time at the measuring device and $t_{c1}$ is a time delay, caused by at least one cluster, to the first arrival path.

9. The method according to claim 8, further comprising receiving a request from the positioning device requesting relative time measurements to identified clusters(s) by providing at least the relative time to the first arrival path, for enabling the positioning device to compute a relative time given by:

$$t2_{MP}=t2+t_{c1}$$

where t2 is a signal reception time at the positioning device and $t_{c1}$ is the time delay, caused by at least one cluster, to the first arrival path.

10. The method according to claim 1, wherein the first lobe includes the first arrival path and at least two samples defining a rising edge and/or a falling edge of the first lobe.

11. A measuring device configured to communicate with a positioning device, the measuring device comprising a processor and a memory containing instructions executable by the processor whereby the measuring device is operative to:
determine a cross-correlation between a received signal and a transmitted reference signal;
determine a channel impulse response (CIR) of the cross-correlation, related to a first lobe detected above a selected threshold in said CIR; and
report a truncated part of the CIR around the first lobe to the positioning device for enabling the positioning device to correct or estimate a measurement related to a distance between a transmitter and the measuring device and/or a distance between at least one reflecting cluster and the measuring device, wherein the first lobe includes a first arrival path, and the truncated part of the CIR includes a selected number of samples around the first arrival path included in the first lobe in the CIR.

12. The measuring device according to claim 11, wherein when the measuring device is a user device, the user device is configured to communicate with the positioning device over an LTE positioning protocol (LPP) interface, the user device configured to communicate with the positioning device over a sidelink interface, and when the measuring device is a network node, the network node is configured to communicate with the positioning device over a New Radio Positioning Protocol A (NRPPa) interface.

13. A method performed by a positioning device configured to communicate with a measuring device, the method comprising:
configuring the measuring device to determine a cross-correlation between a received signal received by the measuring device and a transmitted reference signal;
configuring the measuring device to determine a channel impulse response (CIR) of the cross-correlation, related to a first lobe detected above a selected threshold in said CIR;
receiving from the measuring device a report including a truncated part of the CIR around the first lobe, wherein the first lobe includes a first arrival path, and the truncated part of the CIR includes a selected number of samples around the first arrival path included in the first lobe in the CIR; and
correcting or estimating a measurement related to a distance between a transmitter and the measuring device and/or a distance between at least one reflecting cluster and the measuring device.

14. The method according to claim 13, wherein the truncated part of the CIR comprises complex valued out of the CIR including a real and imaginary output of the CIR around said first lobe.

15. The method according to claim 13, wherein the truncated part of the CIR is received in a message including at least a start position relative a coarse time-of-arrival (TOA) estimate of the first arrival path and a number of the complex valued of the selected samples; and a number of antennas used for said reporting.

16. The method according to claim 14, further comprising receiving information on the complex valued time domain CIR at a sampling frequency according to a used bandwidth.

17. The method according to claim 13, further comprising transmitting a request to the measuring device, requesting measurement of a relative time from the first arrival path to said at least one reflecting cluster at one or more time instants, wherein the relative time is given by:

$$t4_{MP}=t4+t_{c1}$$

where t4 is a signal reception time at the measuring device and $t_{c1}$ is a time delay, caused by at least one cluster, to the first arrival path.

18. The method according to claim 17, further comprising transmitting a request to the measuring device, requesting relative time measurements to identified clusters(s) by providing at least the relative time to the first arrival path, for enabling computing a relative time given by:

$$t2_{MP}=t2+t_{c1}$$

where t2 is a signal reception time at the positioning device and $t_{c1}$ is the time delay, caused by at least one cluster, to the first arrival path.

19. The positioning device according to claim 18, the positioning device including a Location Management Function.

20. A positioning device configured to communicate with a measuring device, the positioning device comprising a processor and a memory containing instructions executable by the processor whereby the positioning device is operative to:
configure the measuring device to determine a cross-correlation between a received signal received by the measuring device and a transmitted reference signal;
configure the measuring device to determine a channel impulse response (CIR) of the cross-correlation, related to a first lobe detected above a selected threshold in said CIR;
receiving from the measuring device a report including a truncated part of the CIR around the first lobe, wherein the first lobe includes a first arrival path, and the truncated part of the CIR includes a selected number of samples around the first arrival path included in the first lobe in the CIR; and
correct or estimating a measurement related to a distance between a transmitter and the measuring device and/or a distance between at least one reflecting cluster and the measuring device.

* * * * *